United States Patent
Cherian et al.

(10) Patent No.: US 11,269,418 B2
(45) Date of Patent: Mar. 8, 2022

(54) PROXIMITY SELECTOR

(71) Applicant: Microsoft Technology Licensing, LLC, Redmond, WA (US)

(72) Inventors: Lisa C. Cherian, Kirkland, WA (US); Nassr Albahadly, Bellevue, WA (US); ArunKumar Narayanan Kotiedath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/437,548

(22) Filed: Jun. 11, 2019

(65) Prior Publication Data

US 2019/0294292 A1 Sep. 26, 2019

Related U.S. Application Data

(63) Continuation of application No. 15/629,141, filed on Jun. 21, 2017, now Pat. No. 10,345,957.

(51) Int. Cl.
| | |
|---|---|
| G06F 3/01 | (2006.01) |
| G06F 3/0482 | (2013.01) |
| G06F 3/038 | (2013.01) |
| G06F 3/04842 | (2022.01) |

(52) U.S. Cl.
CPC .............. G06F 3/017 (2013.01); G06F 3/038 (2013.01); G06F 3/0482 (2013.01); G06F 3/04842 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,973,692 A | * | 10/1999 | Knowlton | G06F 16/954 715/835 |
| 10,613,748 B2 | * | 4/2020 | Alcorn | G06F 16/248 |
| 2010/0085318 A1 | * | 4/2010 | Lee | G06F 3/0482 345/173 |
| 2012/0249595 A1 | * | 10/2012 | Feinstein | G06F 3/04845 345/642 |
| 2015/0058754 A1 | * | 2/2015 | Rauh | H04L 65/403 715/753 |
| 2018/0300302 A1 | * | 10/2018 | Holley | G06F 40/30 |
| 2018/0302232 A1 | * | 10/2018 | Rodrigues | G06F 40/169 |
| 2018/0357206 A1 | * | 12/2018 | Biswas | G06K 9/00416 |

* cited by examiner

Primary Examiner — Van N Chow
(74) Attorney, Agent, or Firm — Talem IP Law, LLP

(57) ABSTRACT

A proximity selection feature of a content creation and consumption application for selecting proximate content displayed by a computing device is described. The content application can initiate a selection mode in response to receiving, for example, a command to enter the selection mode or a defined gesture. The content application can identify an origination point and surface a two-dimensional selection shape anchored to the origination point. The selection shape may form an original capture area. The origination point is a location on a user interface where the selection shape is to be surfaced, anchored to, and have a capture area expanded from. After surfacing the selection shape, the content application can receive indicia of expansion, and based on the indicia of expansion, expand the selection shape from its original capture area to an expanded capture area to capture content proximate the original capture area.

17 Claims, 16 Drawing Sheets

PROXIMITY SELECTOR

CROSS-REFERENCE TO RELATED APPLICATION(S)

This application is a continuation application of U.S. application Ser. No. 15/629,141, filed Jun. 21, 2017.

BACKGROUND

The collaboration, creating, and editing of content through content creation and consumption applications can be conducted in many different settings, such as classrooms, meetings, seminars, and conferences. Users of such applications utilize different resources to display the content. One resource includes large screen digital devices, such as interactive whiteboards.

However, the collaboration, creating, and editing of content on large screen digital devices can be challenging. Often, users want to select groups of items that are located close to each other, but not close to the location of the user, resulting in the user having to perform large arm movements or walk across to the other side of the large screen digital device in order to select the content.

BRIEF SUMMARY

A proximity selection feature of a content creation and consumption application ("content application") for selecting proximate content displayed by a computing device is described. The proximity selection feature can capture proximate content starting at an origination point.

The content application can initiate a selection mode in response to receiving, for example, a command to enter the selection mode or a defined gesture. The content application can identify an origination point and surface a selection shape anchored to the origination point. The origination point is a location on a user interface where a two-dimensional selection shape is to be surfaced, anchored to, and have a capture area expanded from. The selection shape forms an original capture area. After surfacing the selection shape, the content application can receive indicia of expansion, and based on the indicia of expansion, expand the selection shape from its original capture area to an expanded capture area to capture content proximate the original capture area. Additionally, the content application can receive indicia of contraction, and based on the indicia of contraction, contract the selection shape to remove content from the captured content area.

The content application may provide an identifier for the captured content, which may be a modification to the captured content. The modification can include highlighting the captured content or changing a property of the captured content, such as color or size. In some cases, alternatively or in addition to the modification of the captured content, a box surrounds the captured content. Further, once "captured", the captured content may be manipulated, for example, by moving, rotating, or scaling the captured content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6A-6D illustrate example scenarios of selecting proximate content.

DETAILED DESCRIPTION

Figure 1A:
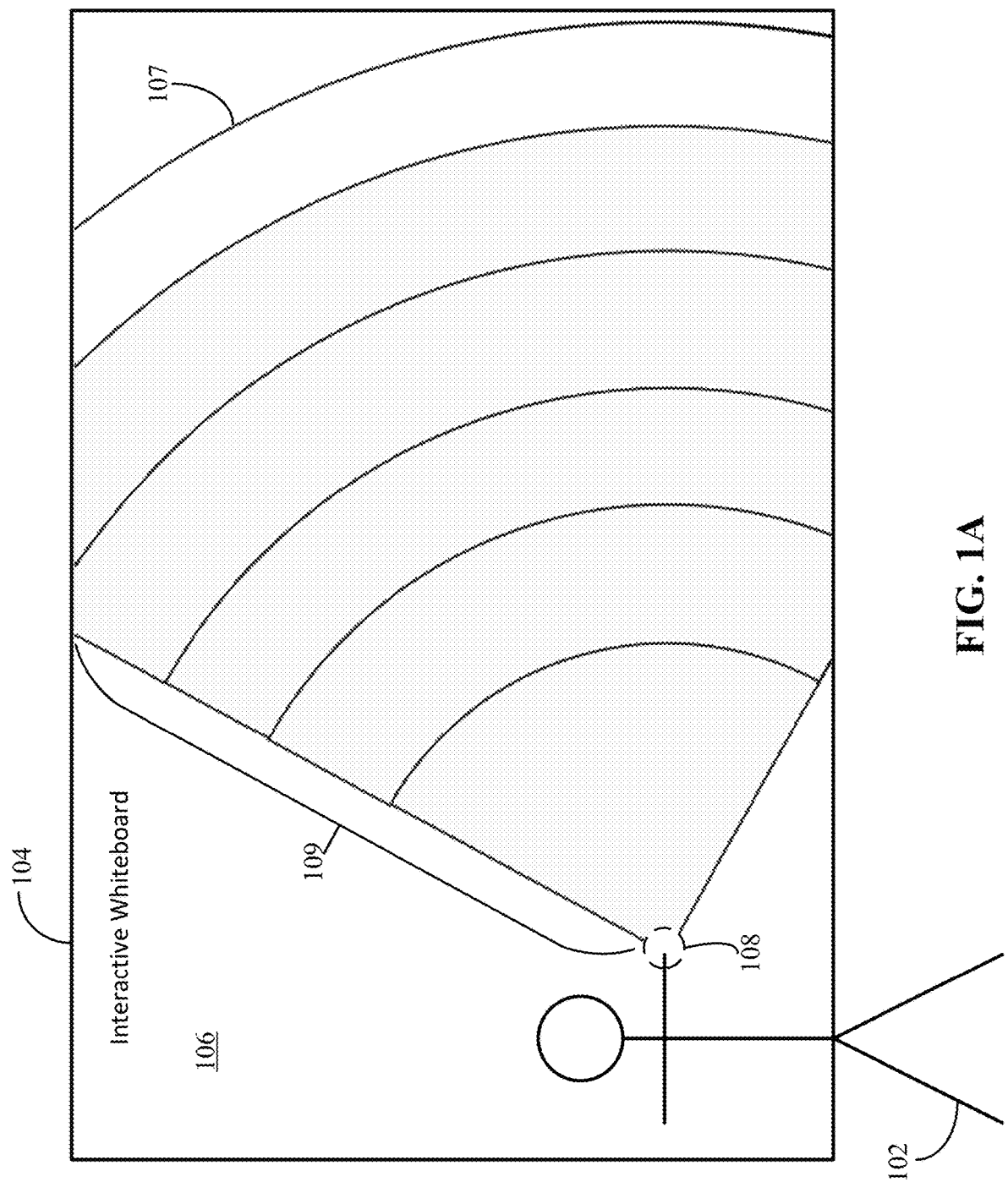
FIGS. 1A and 1B illustrate example operating environments in which various embodiments of the invention may be carried out.

A proximity selection feature of a content creation and consumption application ("content application") for selecting proximate content displayed by a computing device is described. The proximity selection feature can capture proximate content starting at an origination point.

The proximity selection feature may allow a user to quickly and easily identify a zone that emanates from the origination point to select items that are located close together spatially. The proximity selection feature is beneficial for the selection of items on large screen digital devices, such as an interactive whiteboard, as there is a large area where content can be displayed. Because of the large form factor, it can be desirable to have a feature that allows the user to select content far away without physically having to walk over to the content or reach the content. For example, a user may be too short to reach the top of the device or may be in a wheelchair.

The described invention relates to the ability to select an area on a user interface and identify content within that area. The proximity selection feature evaluates the distance from the selection point to identify proximate content. Through the described proximity selection feature, the user can select content that is being displayed separate from where the user is interacting with the user interface without having to move their body away from their position. The proximity selection feature can select content that is located close together spatially via a selection shape. The proximity selection feature can then expand the selection shape to continue to select proximate content, including content far away from the position of the user.

The described proximity selection feature is suitable for content creation and consumption applications that support a variety of different types of content, such as, but not limited to, digital ink, text, graphics, and images. The user interactions with the content creation and consumption application may be performed via a stylus, pen, user finger, or mouse, or other user interface device.

Digital ink refers to the mode of user input where a stylus or pen (or even user finger of a touchscreen or pad) is used to capture handwriting in its natural form. Digital ink strokes are markings that are represented by a set of properties and point data that a digitizer captures.

Content creation and consumption applications are software applications in which users can contribute, consume, and/or modify content. The content can be visual content where users can create text and/or image-based content in digital form. The content creation and consumption application may include a reader application and/or an editor application. The term "content creation and consumption application" may in some cases be synonymous with "content authoring application", "productivity application", or "content authoring tool", and such terms may be used interchangeably herein.

A large screen display refers to a large output device for presentation of information in visual or tactile form. The large screen display can be a standalone computing device or a large touchpad display for a separate computing device.

An interactive whiteboard is one example of a large screen interactive display with a form factor of a whiteboard. The interactive whiteboard may be used in a variety of settings, such as classrooms and corporate environments.

The terms "captured" and "selected" are used interchangeably herein.

The content application can initiate a selection mode in response to receiving, for example, a command to enter the selection mode or a defined gesture. The content application can identify an origination point and surface a selection shape anchored to the origination point. The origination point is a location on a user interface where the two-dimensional selection shape is to be surfaced, anchored to, and have a capture area expanded from. The surfaced selection shape forms an original capture area. After surfacing the selection shape, the content application can receive indicia of expansion, and based on the indicia of expansion, expand the selection shape from its original capture area to an expanded capture area to capture content proximate the original capture area. Additionally, the content application can receive indicia of contraction, and based on the indicia of contraction, contract the selection shape to remove content from the captured content area.

The content application may provide an identifier that identifies the content that has been captured. The identifier may be a modification to the captured content. The modification can include highlighting the captured content or changing a property of the captured content, such as color or size. In some cases, alternatively or in addition to the modification of the captured content, a box surrounds the captured content. Once "captured" by being within a captured content area, the captured content may be manipulated, for example, by moving, rotating, deleting, adjusting formatting, or scaling the captured content.

Figure 1B:
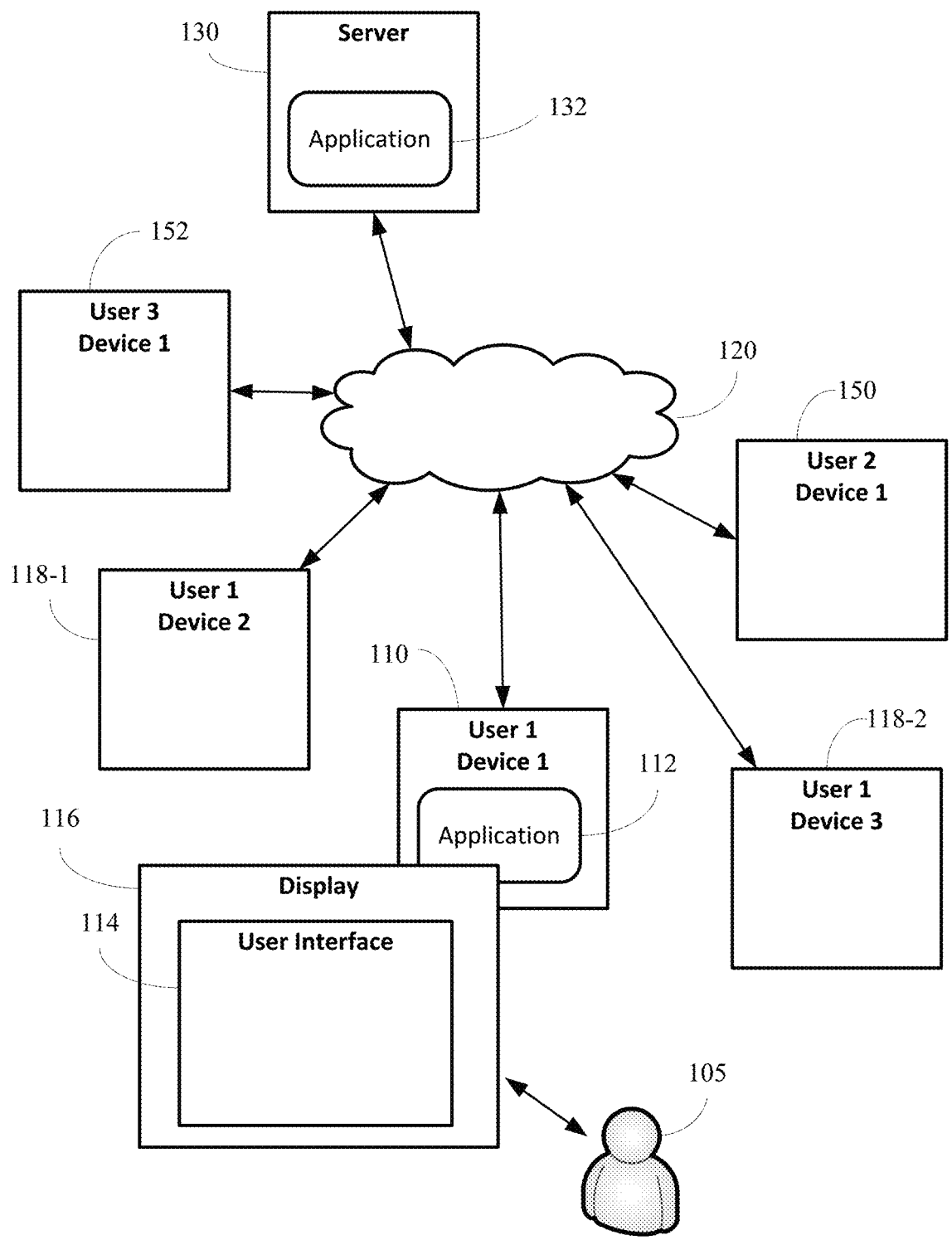

FIGS. 1A and 1B illustrate example operating environments in which various embodiments of the invention may be carried out. Referring to FIG. 1A, a user 102 may be collaborating, creating, or editing content on a computing device, such as an interactive whiteboard 104 in a variety of settings, such as a classroom or corporate environment. The interactive whiteboard 104 may be embodied as system 800 such as described with respect to FIG. 8.

In one example, the user 102 may be a teacher using the interactive whiteboard 104 in a classroom setting. In another example, the user 102 may be using the interactive whiteboard 104 in a corporate setting, such as during a meeting, conference, or seminar.

The user interface ("UI") 106 can refer to the graphical user interface through which content appears to be created, conceptually being a substrate for a work of authorship. The user 102 may manipulate a selection shape 107 surfaced (or rendered) on the UI 106 to select content that is separate from where the user 102 is interacting with the UI 106. For example, the user 102 can perform a single-handed user interaction, such as a gesture or multiple finger gesture, with the UI 106 that allows the user 102 to select content that the user 102 cannot reach.

The user 102 may press and hold a point on the UI 106, such as origination point 108. The origination point 108 is the point at which the selection shape 107 is to be surfaced, anchored to, and have a capture area expanded from. As the user 102 holds down on the origination point, the capture area of the selection shape 107 can expand outward to select content. In some cases, any content within the selection shape 107 may be selected. In other cases, the selection shape 107 may be segmented into zones and the user 102 can tap in one of the zones to select content. A shaded area 109 may be provided within the selection shape 109 to identify selected content. In this case, a user may modify the shaded area 109 using a variety of touch gestures, such as a tap, a drag, or a slide, and any content within the shaded area 109 may be selected.

The proximity selection feature can be a standalone application or a proximity selection feature of the content application to provide the functionality within the content application.

Referring to FIG. 1B, a user 105 may interact with a user computing device 110 running application 112, such as a content application, through a UI 114 displayed on a display 116 associated with the computing device 110.

A computing device (e.g., the user computing device 110) is configured to receive input from a user (e.g., user 105) through, for example, a keyboard, mouse, trackpad, touch pad, touch screen, microphone, or other input device. The display 116 of the user computing device 110 is configured to display one or more user interfaces (including UI 114) to the user 105. In some embodiments, the display 116 can include a touchscreen such that the user computing device 110 may receive user input through the display. In some cases, the display 116 is a large screen display.

The UI 114 enables a user to interact with various applications, such as the content application, running on or displayed through the user computing device 110. Generally, UI 114 is configured such that a user may easily interact with functionality of an application. For example, a user may simply select (via, for example, touch, clicking, gesture or voice) an option within UI 114 to perform an operation such as selecting content being authored or edited in an application 112.

The user 105 can execute numerous commands through the UI 114 in order to perform specific tasks related to features available in the application 112. In some cases, the user 105 may have multiple devices running a similar program and the user 105 can edit a same or different document (or other content) across multiple user computing devices (such as second device 118-1 and/or third device 118-2).

The user computing device 110 (as well as the second device 118-1 and the third device 118-2) may operate on or in communication with a network 120, and may communicate with one or more servers 130 over the network 120.

The network 120 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 120 may include one or more connected networks (e.g., a multi-network environment) including public networks, such as the Internet, and/or private networks such as a secure enterprise private network.

Access to the network 120 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The user computing device 110 can be, but is not limited to, a personal computer (e.g. desktop computer), laptop, personal digital assistant (PDA), video game device, mobile phone (or smart phone), tablet, slate, terminal, an interactive whiteboard, and the like. It should be apparent that the user computing device 110 may be any type of computer system that provides its user the ability to load and execute software programs and the ability to access a network, such as network 120. The second device 118-1 and third device 118-2 may include the same types of devices (or systems) as user computing device 110 and they may or may not be of a same form. For example, a user 105 may have a laptop, a tablet, and a smart phone as the three devices.

The application 112 can be stored on the user computing device 110 (e.g., a client-side application). In another embodiment, the user 105 may access a web-based application 132 (e.g., running on server 130 or hosted on a cloud) using a web browser (e.g., a standard internet browser), and the application's interface may be displayed to the user 105 within the web browser. Thus, the application may be a client-side application and/or a non-client side (e.g., a web-based) application.

Figure 2:
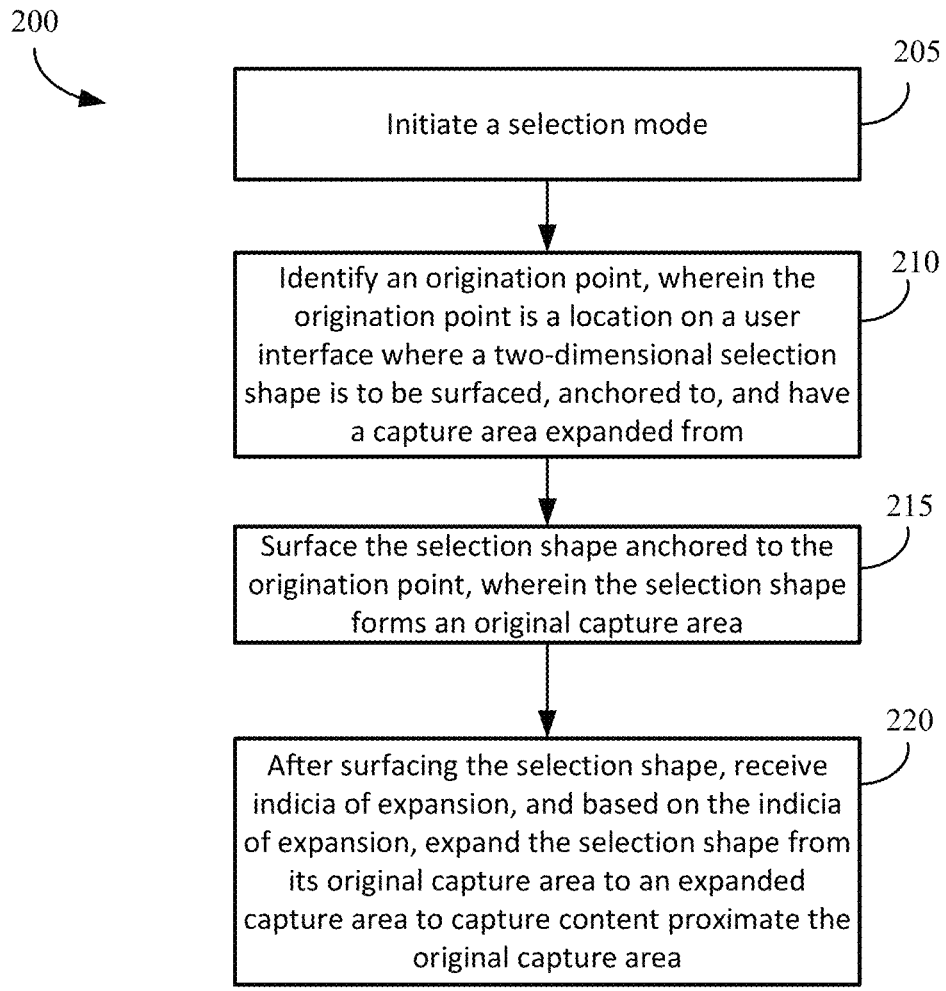
FIG. 2 illustrates an example process flow diagram of a method for selecting proximate content.
Figure 3:
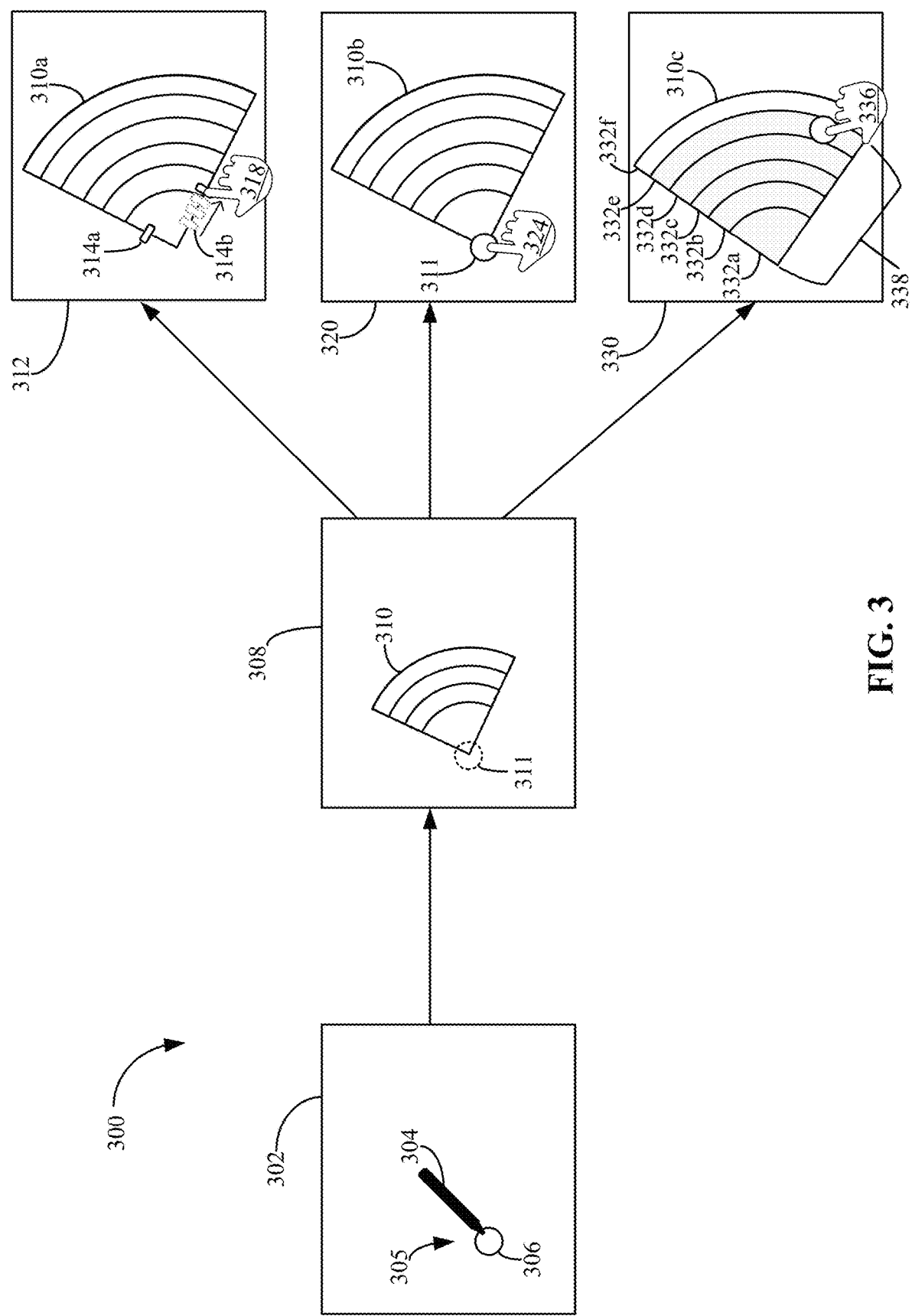
FIG. 3 illustrates an example representation of selecting proximate content.

FIG. 2 illustrates an example process flow diagram of a method for selecting proximate content; and FIG. 3 illustrates an example representation of selecting proximate content. Referring to FIG. 2, a content application performing process 200 via a proximity selection feature, can be implemented by a user device, which can be embodied as described with respect to computing system 800 shown in FIG. 8.

The content application can initiate a selection mode (205). The selection mode can be initiated in response to receiving a variety of user interactions with the UI, such as, but not limited to, receiving a command to enter selection mode or receiving a defined gesture. As previously described, the user interactions with the UI may be accomplished via input mechanisms of a stylus, pen, or finger (on a touch screen or pad).

In the case of receiving a command to enter selection mode, the content application may receive a selection of a selection icon. The selection icon may be displayed at any location on the UI, such as a tool bar of the content application.

Figure 7A:
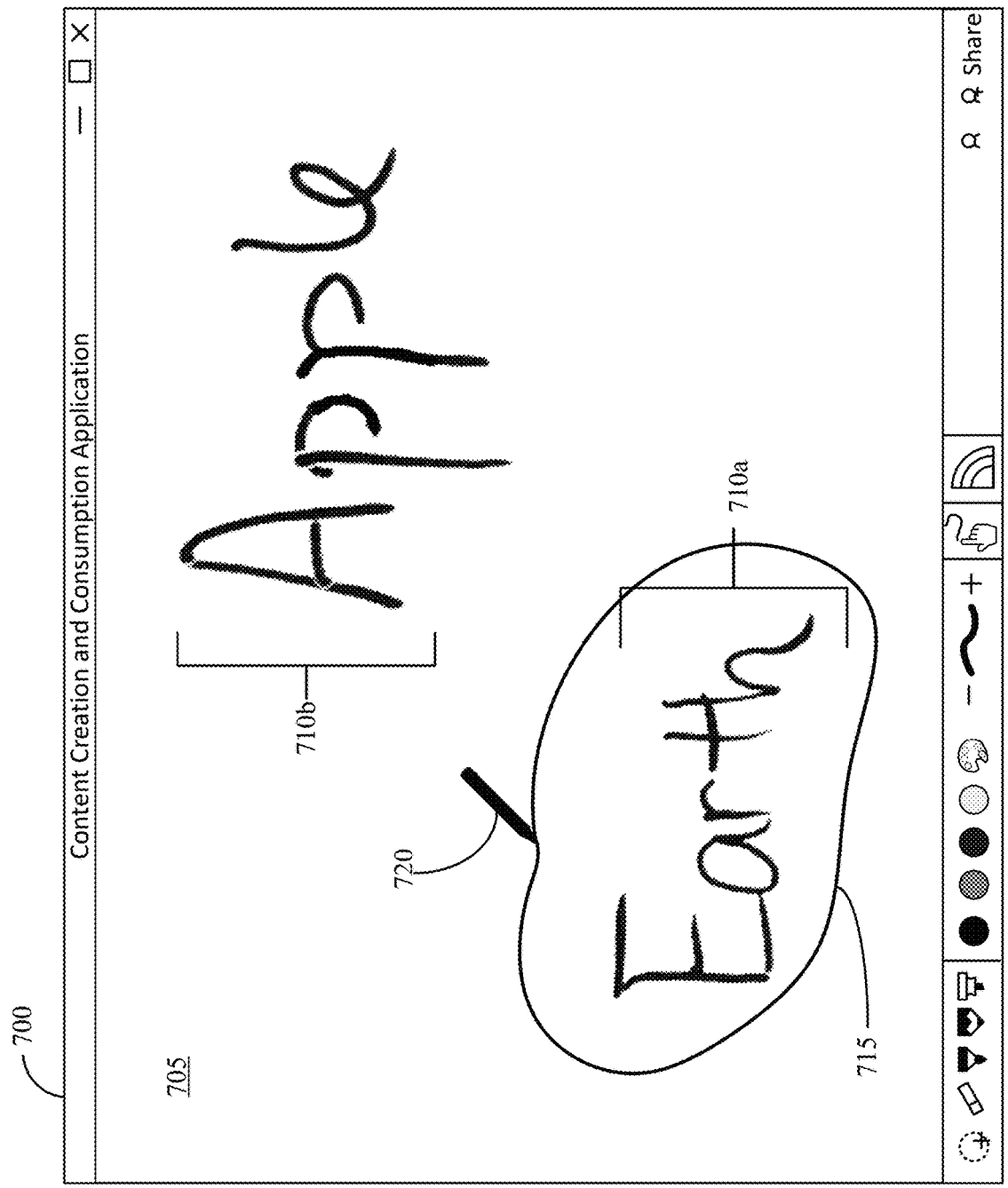
FIGS. 7A-7E illustrate example scenarios of selecting proximate content.
Figure 7B:
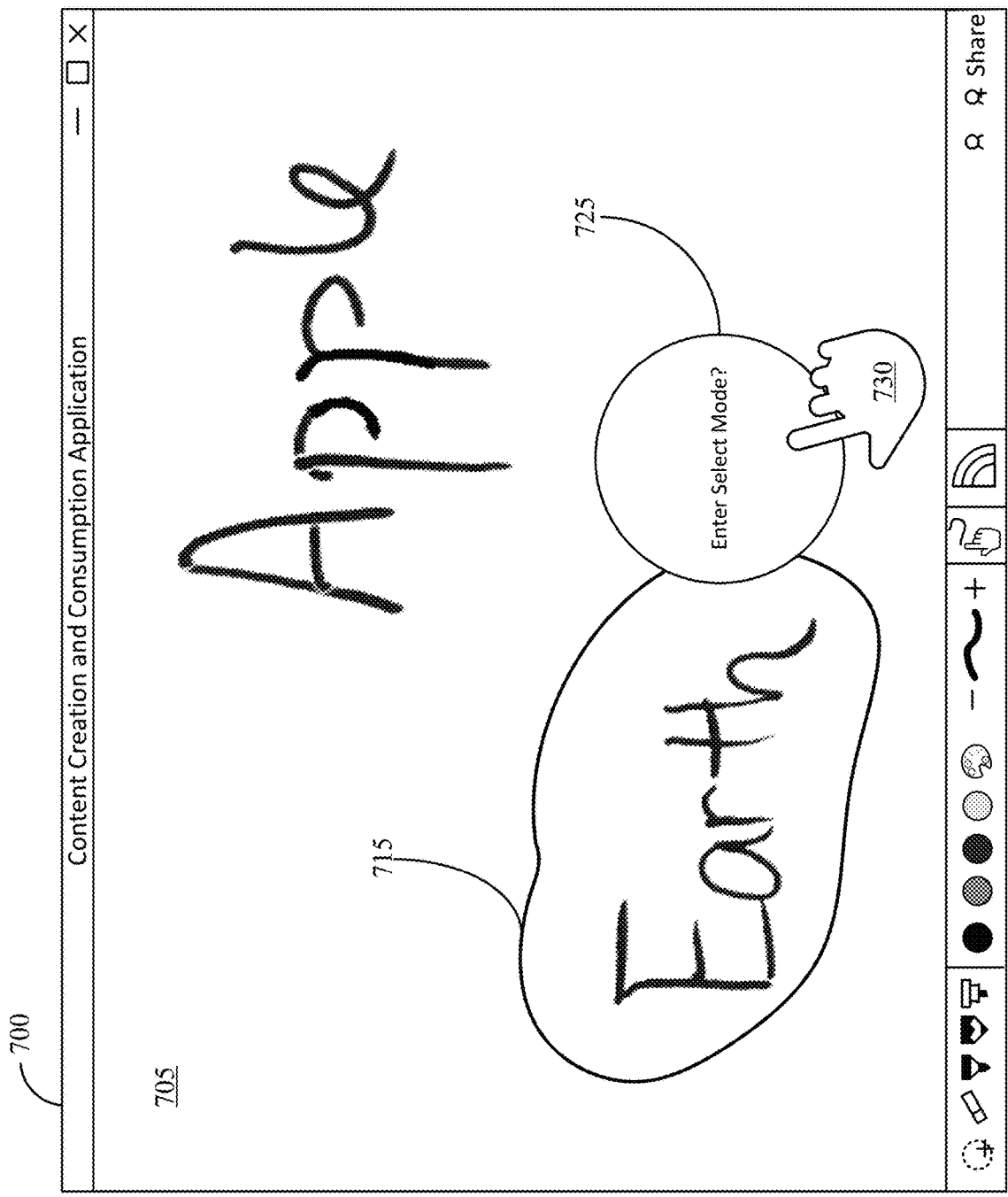

In the case of receiving a defined gesture, one example of receiving the defined gesture includes an encircling and a context menu selection (see e.g., scenario shown in FIGS. 7A and 7B). In this example, a user may draw a circle on the UI in digital ink. The content application can then display a context menu that includes a selection icon. The selection icon may ask the user if they would like to enter selection mode. If the user selects the selection icon, the content application can initiate the selection mode. If, after a period of time, the user does not select the selection icon, the content application will not initiate the selection mode and the circle will remain digital ink.

In another example of receiving the defined gesture, the defined gesture includes a tap and hold touch gesture. In this case, a user may tap and hold a point on the UI for a period of time. If the period of time is greater than a selection time threshold used by the application to identify whether the gesture corresponds to a command to initiate selection mode, then the content application can initiate the selection mode.

Once the content application initiates the selection mode (205), the content application can then identify an origination point (210) and surface the selection shape anchored to the origination point (215). The origination point is a location on the UI where a two-dimensional selection shape is to be surfaced, anchored to, and have a capture area expanded from. The origination point may be any point on the UI. The origination point does not have to be a location on the UI that includes content. The origination point may not be near content, but once the selection shape is surfaced, the selection shape may be expanded to cover some or all of the content.

In some cases, the origination point can be a default origination point. For example, the origination point may be the same location any time the selection mode is initiated. In other cases, the origination point may be a location at which the content application received the user interaction with the UI. For example, the origination point may be the location at which the user performed the tap and hold defined touch gesture.

Additionally, the selection shape can be a variety of two dimensional shapes, as will be discussed in more detail. The selection shape may be segmented into one or more sections (e.g., zones). The variety of shapes available for the selection shape may allow flexibility with the customization of the zones. For example, a rectangular selection shape may allow individual lines of content to be selected easily.

Further, the surfaced selection shape forms an original capture area. The selection shape may be moved to different locations on the UI. For example, the selection shape may be moved near content or to cover content within the original capture area on the UI. In another example, the selection shape may be moved to a bottom corner of the display to more easily select all the content on the display. Any time the selection shape is moved, the content application identifies a new origination point in which to anchor the selection shape.

Referring to FIG. 3, as illustrated at block 302, a user may use a stylus 304 to perform a defined gesture (e.g., tap and hold 305 touch gesture) on a point 306 of the UI. When the content application receives this defined gesture, the content application can initiate the selection mode. In this case, the content application can identify the point 306 as being the origination point (e.g., origination point 311 at block 308). At block 308, the content application can surface the selection shape 310 anchored to the origination point 311.

Referring back to FIG. 2, after the content application has surfaced the selection shape anchored to the origination point (215), the content application can receive indicia of expansion; and based on the indicia of expansion, can expand the selection shape from its original capture area to an expanded capture area to capture content proximate to the original capture area (220). The indicia of expansion can comprise, for example, one or more of a time of a hold, a location of a tap, and a direction of a drag. The indicia of expansion may be received through a variety of user interactions with the UI, such as, but not limited to, a tap control, a drag control, and a slide control.

Referring again to FIG. 3, there are three examples shown for expansion of selection shape 310. In block 312, the selection shape 310a may include one or more indicator handles (e.g., indicator handle 314a and indicator handle 314b). The indicator handles may be any shape and may allow the user to control the expansion and contraction of the selection shape 310a. In this example, the user may drag and hold (318) the indicator handle 314b in the direction of the desired expansion. Based on the direction of the drag and the time of the hold, the selection shape 310a can continue to expand in the direction of the drag until the user releases the hold. Advantageously, the user may only need to drag the indicator handle 314b a short distance. This allows a user to stand at one end of a large screen display, and without having to walk to the other end or perform large arm movements, expand the selection shape 310a to capture content that is located on the other end of the large screen display by performing a short drag gesture.

In some cases, the indicator handles may be omitted from the selection shape 310a. The indicator handles may be located adjacent the selection shape 310a or omitted entirely and the expansion and contraction be controlled by gestures not having visual indicators. For example, a user interaction may be a swipe gesture on the selection shape 310a or near the selection shape 310a and the content application will understand that a selection/expansion/contraction is desired. For example, the user may make a drag and hold gesture near the selection shape 310a and the content application will still receive the indicia of expansion.

In another example not shown in FIG. 3, the user may drag an edge of the selection shape 310 to expand to capture desired content. As the user drags the edge of the selection shape 310 in a direction of the desired content, the selection shape 310 may grow and expand until the user stops the drag gesture.

Returning to FIG. 3, in block 320, the user may tap and hold (324) a point on or near the selection shape 310b, such as the origination point 311. Based on the time of the hold, the selection shape 310b can continue to expand from its original capture area to an expanded capture area until the user releases the hold. The selection shape 310b may expand in a variety of directions. In some cases, the direction of the expansion may depend on the shape of the selection shape 310b. For example, selection shape 310b is in the shape of a sector of a circle and can continue to expand outward from the origination point 311. Advantageously, for this user interaction, the user only needs to tap and hold one point on the UI. This allows the user to stand at one end of a large screen display, and without having to walk to the other end or perform large arm movements, expand the selection shape 310b to capture content that is located on the other end of the large screen display.

In block 330, the selection shape 310c may cover a large area of the UI and may be sectioned into several zones (e.g., zone 332a, zone 332b, zone 332c, zone 332d, zone 332e, and zone 332f). The user can tap (336), or perform some other action to indicate a location of a selection of a zone, in one or more of the zones (e.g., zone 332e) of the selection shape 310c. In this example, the content application receives the location of the tap. Then, based on the location of the tap, the selection shape 310c can expand a shaded area 338 of the selection shape 310c to capture content within all the zones up to and including the zone the user performed the tap (e.g., zone 332a, zone 332b, zone 332c, zone 332d, and zone 332e).

Further, the user may tap in an area outside of the selection shape. In this case, additional zones may be added based on the location of the tap to expand the selection shape to allow the content near the location of the tap to be captured.

Additionally, the user may also tap on content outside of the selection shape. In some cases, the selection shape will expand to capture the content at the location of the tap. In other cases, the content application may, based on the location of the tap, expand the selection shape from its original capture area to an expanded capture area to capture the selected objected, as well as any objects near the location of the tap. Also, specific content may be selected or deselected by the user. For example, when the content application has identified groupings of ink strokes, each grouping may be selected or deselected by the user. In this example, if the selection shape is expanded to capture more content than the user intended, the user may tap on the grouping that they would like deselected and that grouping will not be included in the captured content.

In some cases, the captured content may include only the content that the selection shape completely covers within the original capture area or the expanded capture area. For example, a user may write one or more words on the UI, such as "Math 101". If, when the selection shape is expanded, the expanded capture area of the selection shape only covers and selects the word "Math," the captured content may only include "Math" and not the whole phrase, "Math 101."

In other cases, the captured content may include more than the content that is completely covered by the original capture area of the selection shape or the expanded capture area of the selection shape. In an example, the content application may include an ink analyzer. An ink analyzer is a feature that analyzes the ink strokes and identifies inked terms and other recognizable groupings of ink strokes. A grouping of ink strokes that are identified as forming a drawn unit (e.g., term or drawing) can be considered stored within a data structure of an ink container.

In this case, as soon as any part of an identified grouping is selected or covered by one of the capture areas of the selection shape, the whole grouping may be selected. For example, if the content application has identified the word "apple" as a grouping and only the letters "ap" are selected (covered by the selection shape) during the expansion of the selection shape, the content application may include the whole word "apple" as the captured content. In another example, the identified grouping may be "Math 101." If only the word "Math" is selected during the expansion of the selection shape, the content application can include the whole phrase "Math 101" as the captured content.

The content application may perform a proximity calculation to identify what content to capture. In this case, any content within a proximity distance threshold of the selection shape may be selected. The proximity calculation may be used in the case where the content application does not include an ink analyzer to identify groupings. For example, a letter in a word may not have been included in the selection, but may have been intended to be included. The proximity calculation may be used to identify that the letter is close enough to the rest of the letters in the word that has been selected. Therefore, the content application can capture the whole word instead of only a part of the word.

The captured content may be distinguished from the rest of the content in a variety of ways. In some cases, an identifier for the captured content may be provided. The identifier may modify the captured content, for example, by highlighting the captured content or changing a property of the captured content, such as color or size.

The selection shape may include a shaded area to indicate what content has been captured. The shaded area may cover the selected content and does not have to be the same size as the selection shape. For example, the selection shape may include several zones and the shaded area of the selection shape may only include some of those zones.

In addition to the indicia of expansion, the content application can receive indicia of contraction; and based on the indicia of contraction, can contract the selection shape to remove content from the captured content. The indicia of contraction can also comprise, for example, one or more of a time of a hold, a location of a tap (or other gesture indicating location of a selection of a zone), and a direction of a drag and may be received through a variety of user interactions with the UI, such as, but not limited to, a tap control, a drag control, and a slide control.

Further, once the selection shape has been expanded to capture the content, the captured content may be manipulated. For example, the captured content may be moved, rotated, or scaled.

Figure 4:
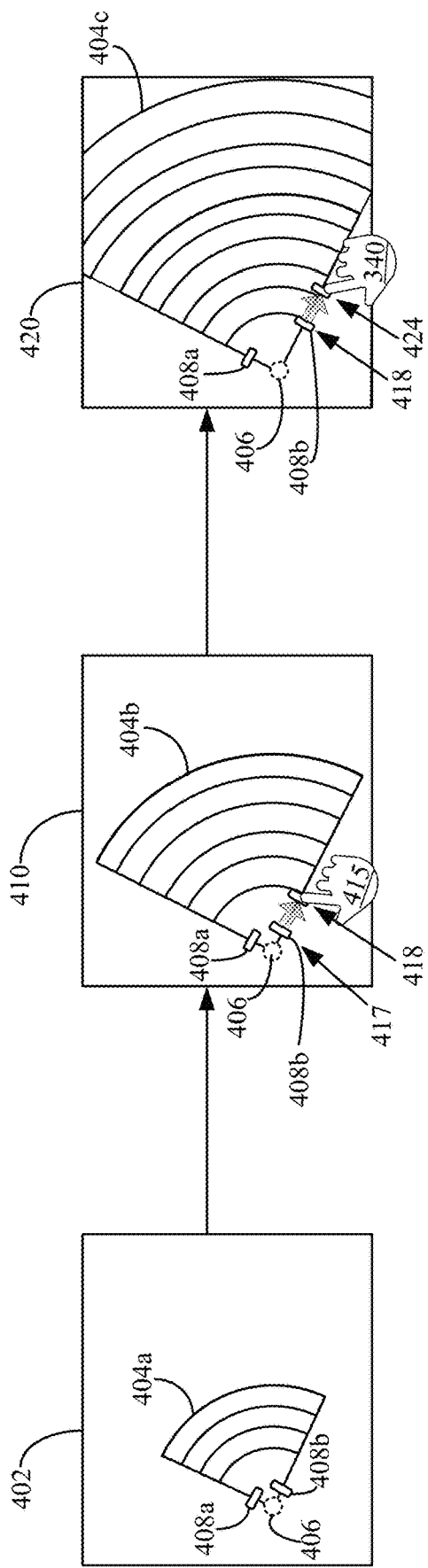
FIG. 4 illustrates an example representation of expansion using an indicator handle.

FIG. 4 illustrates an example representation of expansion using an indicator handle. Referring to FIG. 4, a selection shape may be expanded from an origination point based on a user interaction with an indicator handle. The indicator handle may be used by the user to manipulate the selection shape. Further, the selection shape may be contracted using the indicator handle in the same way as the expansion of the selection shape.

In block 402, a selection shape 404a may be surfaced anchored to origination point 406. The selection shape 404a has an initial size, an original capture area, and includes multiple indicator handles, such as indicator handle 408a and indicator handle 408b. The initial size of selection shape 404a may be a default size or a size based on a user interaction received by a content application in which the content application then initiates a selection mode.

In block 410, a user may drag (415) indicator handle 408b from an initial position 417 to a second position 418. As the user performs the drag gesture (415), the selection shape 404b expands from the origination point 406 to a second size that is larger than the initial size. As the selection shape 404b is expanded, the original capture area is expanded to an expanded capture area to capture content proximate to the original capture area. As previously discussed, the amount of expansion may be determined using a ratio based on the length of the user interaction.

In this case, the indicator handle 408b moves along with the drag gesture (415) and stays at the second position 418 after the drag gesture (415) is performed. In some cases, the indicator handle 408b may return to the initial position 417 after any user interaction.

In block 420, the user may further drag (422) indicator handle 408b from the second position 418 to a third position 424. As the user performs the drag gesture (422), the selection shape 404c (and the expanded capture area) continues to expand from the origination point 406 to a third size that is larger than the second size.

The expansion of the selection shape 404 allows single handed proximity selection of content that is out of reach of the user, thus, minimizing large movements (e.g., large arm movements, taking multiple steps, etc.) performed by the user for large displays.

Figure 5A:
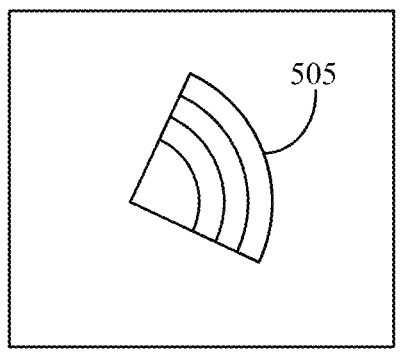
FIGS. 5A-5F illustrate example representations of selection shapes that may be used to implement certain methods and services described herein.
Figure 5B:
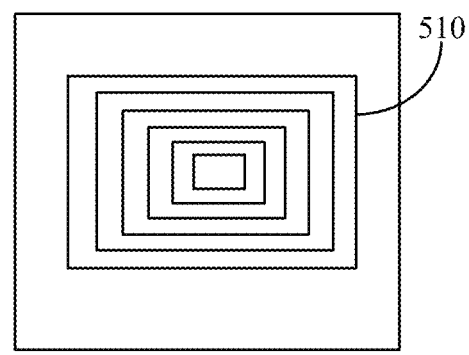
Figure 5C:
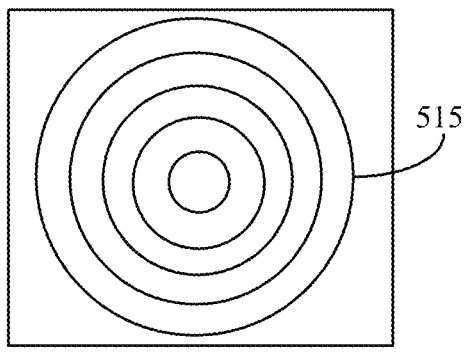
Figure 5D:
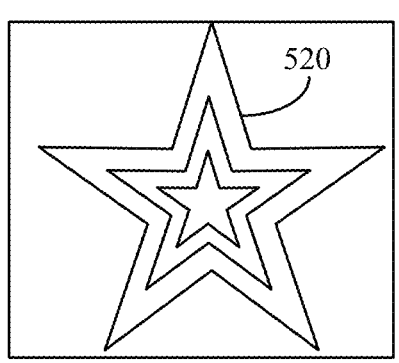

FIGS. 5A-5F illustrate example representations of selection shapes that may be used to implement certain methods and services described herein. These examples are not intended to be limiting and the selection shape may be rendered or surfaced as any suitable shape. Selection shape 505, as shown in FIG. 5A, is surfaced as a sector of a circle. Selection shape 510, as shown in FIG. 5B, is surfaced as a rectangle. Selection shape 515, as shown in FIG. 5C, is surfaced as a circle. Selection shape 520, as shown in FIG. 5D, is surfaced as a star. An expansion or contraction of the illustrated selection shapes may be performed by selection or time as discussed with respect to FIGS. 3 and 4.

For example, the content application may understand a capture area (such as an original capture area or an expanded capture area) of content based on where the selection shape is covering and/or where a selected zone of the selection shape covers.

A selection shape may be expanded or contracted in multiple directions. In some cases, when a content application expands or contracts the selection shape, the entire selection shape may grow or shrink proportionately. In other cases, one side of the selection shape may be expanded or contracted. This type of expansion may change the shape of the selection, for example, from a rectangle to a square or from a circle to an oval. Further, the sides of selection shape 505 may be able to be manipulated to grow the sector of the circle into a full circle.

Figure 5E:
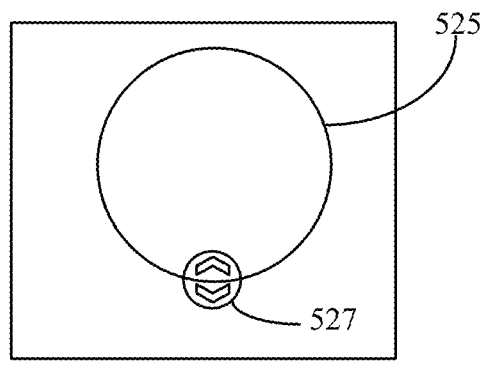
Figure 5F:
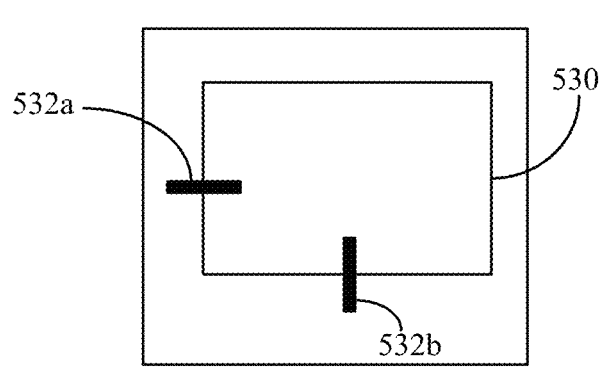

Referring to FIG. 5E and FIG. 5F, expansion or contraction of selection shapes may be performed using an indicator handle. The indicator handle may be any shape. Selection shape 525, as shown in FIG. 5E, is surfaced as a circle and includes indicator handle 527. Indicator handle 527 allows for the expansion or contraction of the diameter of selection shape 525. In some cases, the manipulation of the indicator handle 527 allows for the uniform expansion or contraction of the selection shape 525. In other cases, the manipulation of the indicator handle 527 allows for one or more sides (or segments) of the selection shape 525 to expand or contract. Further, the indicator handle 527 may be moved to a different location along the edge of the selection shape 525.

Selection shape 530, as shown in FIG. 5F, is surfaced as a rectangle and includes multiple indicator handles (e.g., indicator handle 532a and indicator handle 532b). In some cases, the manipulation of indicator handle 532a or indicator handle 532b allows for the uniform expansion or contraction of the selection shape 530. In other cases, the manipulation of the indicator handle 532a allows for one side of the selection shape 530 to expand or contract and the manipulation of the indicator handle 532b allows for another side of the selection shape 530 to expand or contract. Further, the indicator handle 532a and indicator handle 532b may be moved to a different location along the edge of the selection shape 530.

FIGS. 6A-6D illustrate example scenarios of selecting proximate content. The example scenarios of selecting proximate content may be carried out at a content creation and consumption application. A user may open a user interface 605 of a content creation and consumption application 600 on their computing device (embodied, for example, as system 800 described with respect to FIG. 8). The computing device can be any computing device such as, but not limited to, a laptop computer, a desktop computer, a tablet, a personal digital assistant, a smart phone, a smart television, a gaming console, wearable device, an interactive whiteboard, and the like.

Referring to FIG. 6A, the user may input inked content 610 onto the user interface 605 of the content creation and consumption application 600. In some cases, ink analysis may be performed on the inked content 610 to identify at least one grouping of the inked content 610. In this case, the inked content 610 may include content 610a, which is a handwritten inked word "Earth," and content 610b, which is a handwritten inked word "Apple." Further, in this case, content 610a and content 610b are each identified groupings of the inked content 610.

In response to receiving a variety of user interactions with the UI 605, the content application 600 may initiate selection mode. As previously described, the user interactions with the UI 605 may be accomplished via input mechanisms of a stylus, pen, or finger (on a touch screen or pad). For example, the user may tap a selection icon 620 in the UI 605 of the content application 600. In addition, or as an alternative, a user may tap and hold a point on the UI 605 of the content application.

Figure 6B:

Referring to FIG. 6B, upon receiving the user interaction with the UI 605, a selection shape 630 may be displayed to the user at an origination point 635. In this case, the selection shape 630 is a sector of circle, however, the shape of the selection shape 630 may be any suitable shape such as, but not limited to, the shapes shown in FIGS. 5A-5F. In some cases, the shape of the selection shape may be a default shape. In other cases, the content application 600 may include a menu displaying multiple different shapes available to the user as selection shapes. The user may then select the desired shape of the selection shape. In some cases where there are multiple shapes available to the user, the user may change the shape of the selection shape at any time.

As shown in FIG. 6B, the selection shape 630 is surfaced at a location anchored to and extending from origination point 635. The origination point 635 and the selection shape 630 may be moved to another location of the UI 605. For example, the selection shape 630 may be moved to cover part of the content 610b.

Figure 6C:
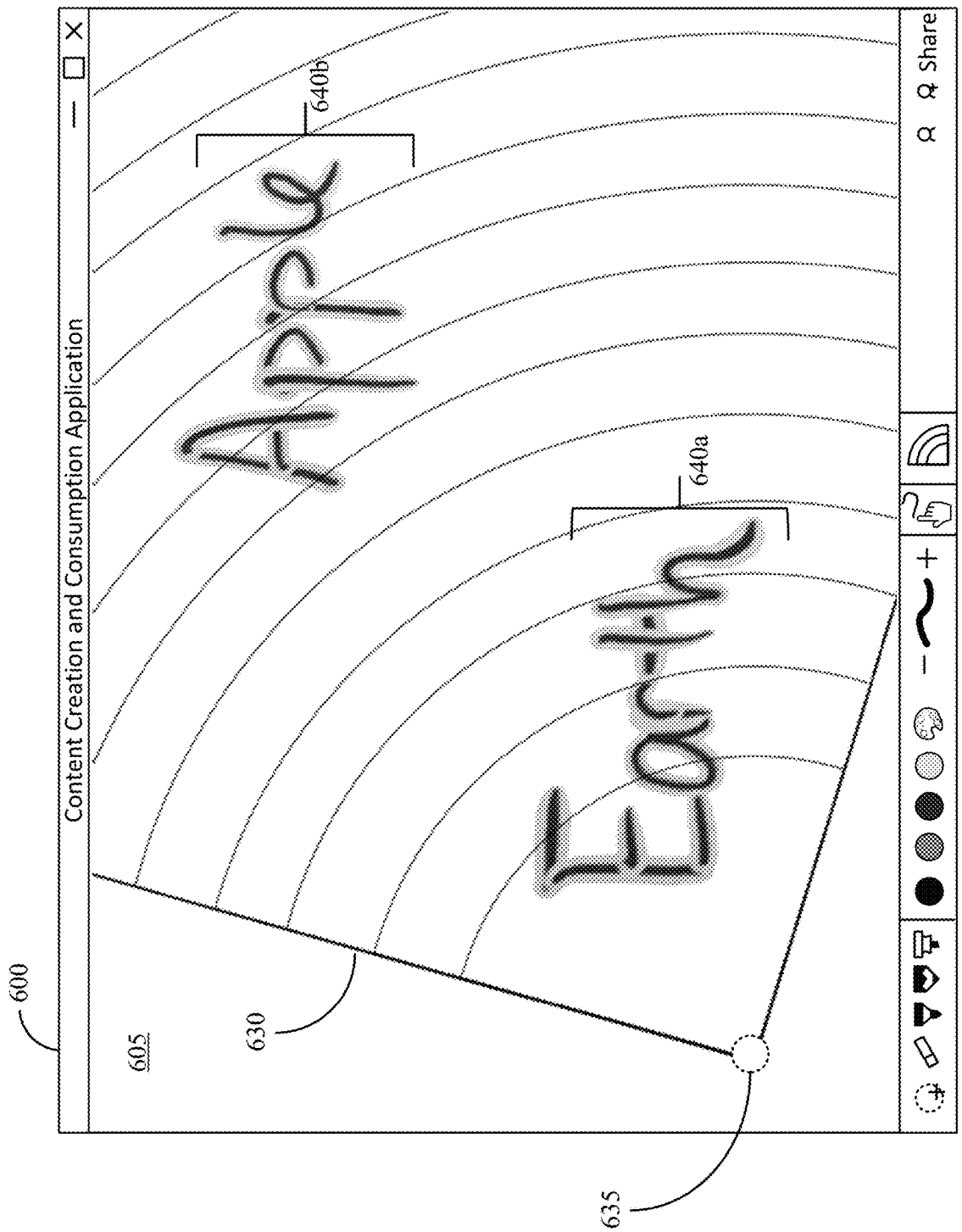

Referring to FIG. 6C, the user may expand the selection shape 630 by any of the previously described methods. In this example, selection shape 630 expands from the origination point 635 to select all the content 610. In this illustrated scenario shown at FIGS. 6B and 6C, anywhere the selection shape is shown creates a capture area and captures the content that it covers. The captured content (e.g., captured content 640a and captured content 640b) can be distinguished from non-selected content by providing an identifier for the captured content. In this case, the captured content is highlighted to identify the captured content as being selected.

Figure 6D:
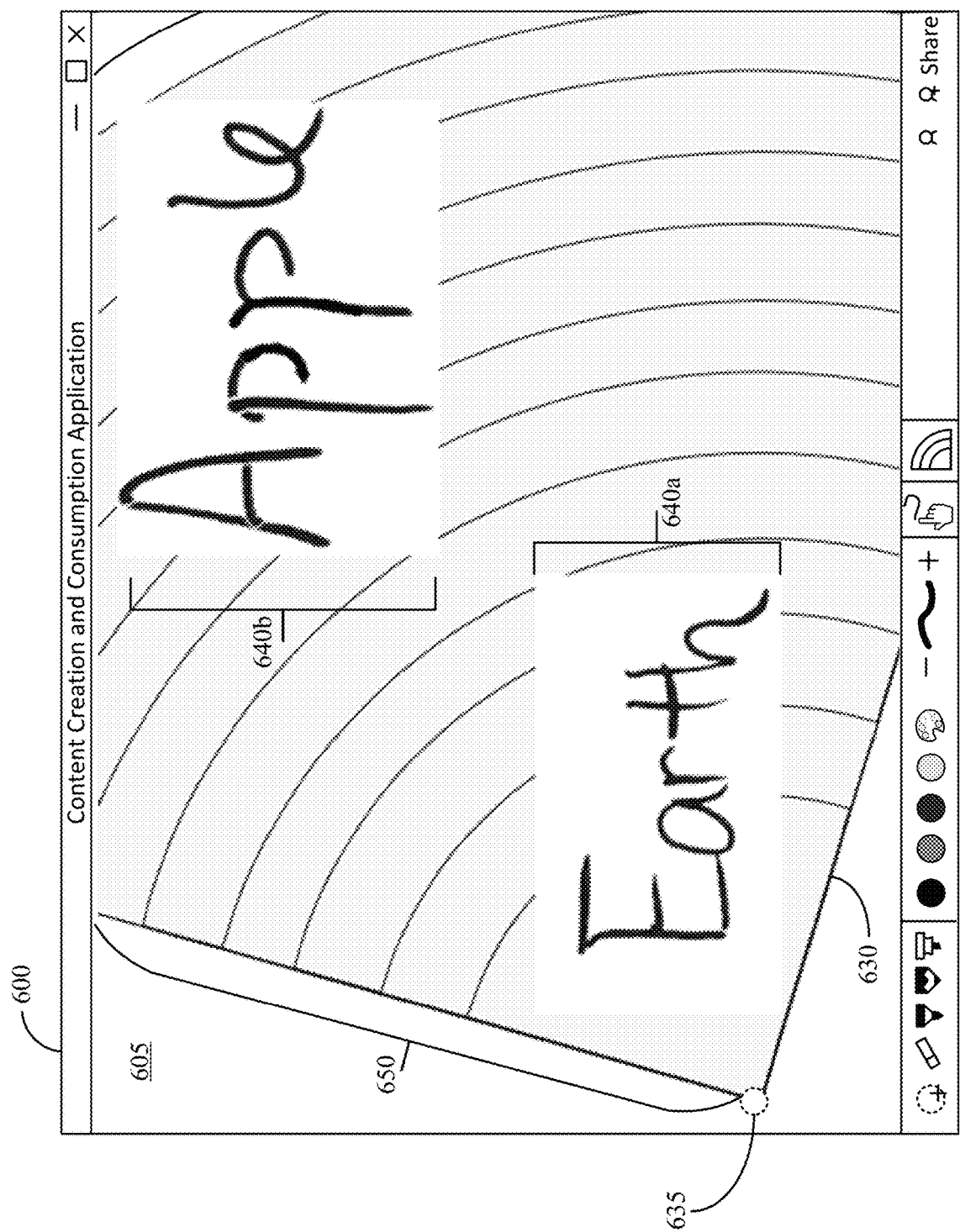

Referring to FIG. 6D, in some cases, the selection shape 630 may expand from the origination point 635 to cover all of the content 610 while not capturing the content 610. That is, capture zones can be displayed but not capture the content within them until selected. The capture area can be indicated by a shaded area. In this case, a shaded area 650 is provided and expanded to capture content (e.g., captured content 640a and captured content 640b). The shaded area 650 of the selection shape 630 may be expanded and contracted by any of the previously described methods.

FIGS. 7A-7E illustrate example scenarios of selecting proximate content. The example scenarios of selecting proximate content may be carried out at a content creation and consumption application. A user may open a user interface 705 of a content creation and consumption application 700 on their computing device (embodied, for example, as system 800 described with respect to FIG. 8). The computing device can be any computing device such as, but not limited to, a laptop computer, a desktop computer, a tablet, a personal digital assistant, a smart phone, a smart television, a gaming console, wearable device, an interactive whiteboard, and the like.

Referring to FIG. 7A, the user may input inked content 710 onto the user interface 705 of the content application 700. In some cases, ink analysis may be performed on the inked content 710 to identify at least one grouping of the inked content 710. In this example, the inked content 710 includes content 710a, which is a handwritten inked word "Earth," and content 710b, which is a handwritten inked word "Apple." Further, in this case, content 710a and content 710b are each identified groupings of the inked content 710.

A user may draw a circle 715 in digital ink on the UI 705 with a stylus 720. The circle 715 may be drawn at any location on the UI 705. In this example, the circle 715 is drawn around content 710a.

Referring to FIG. 7B, upon receiving the drawn circle 715, the content application 700 may display a selection icon 725 as a contextual menu on or near the circle 715. The selection icon 725 can ask the user if they would like to enter selection mode. If the user does not select the selection icon 725, the circle 715 will remain digital ink. In this illustration, the user selects (730) the selection icon 725.

Figure 7C:
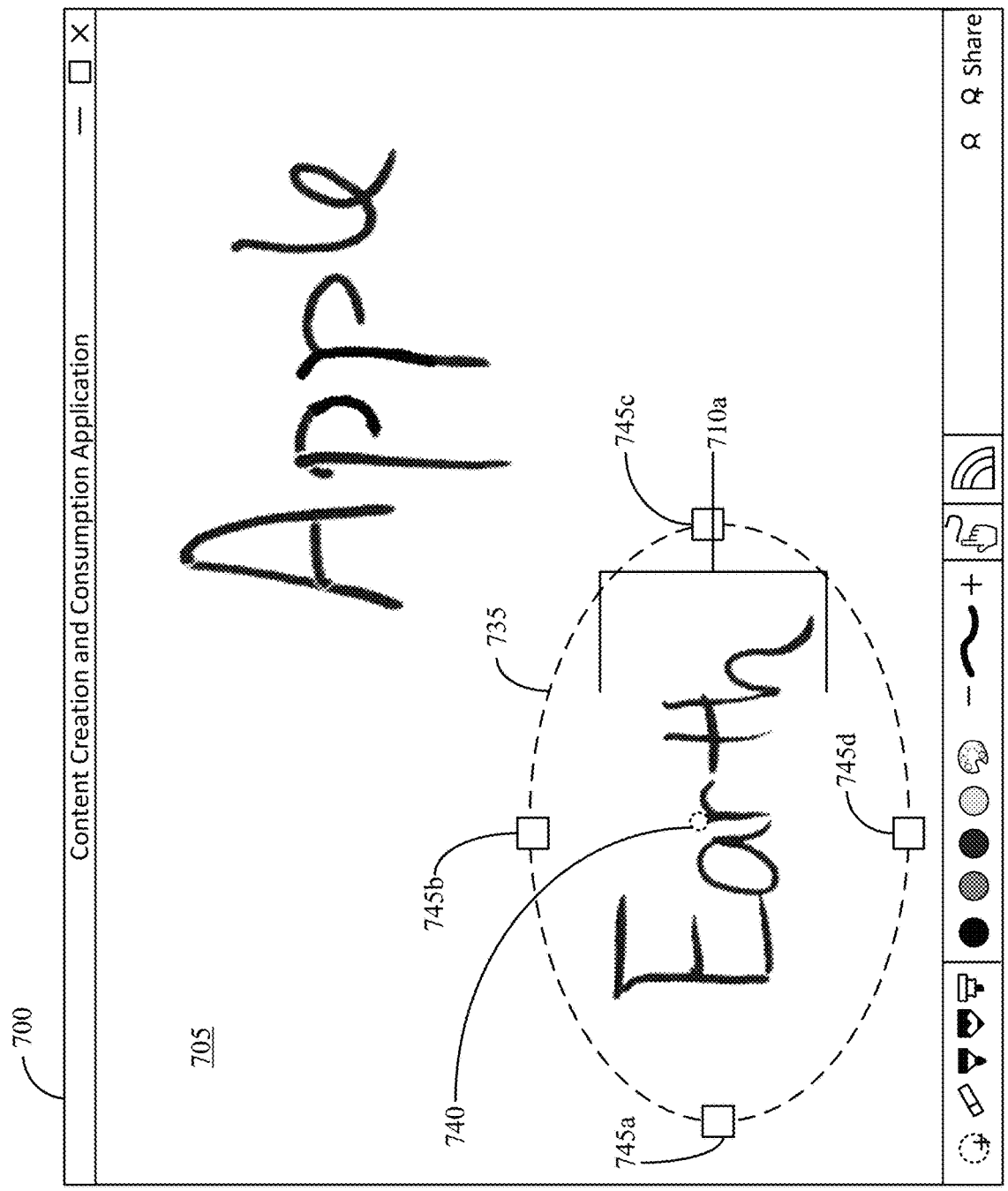
Figure 7D:
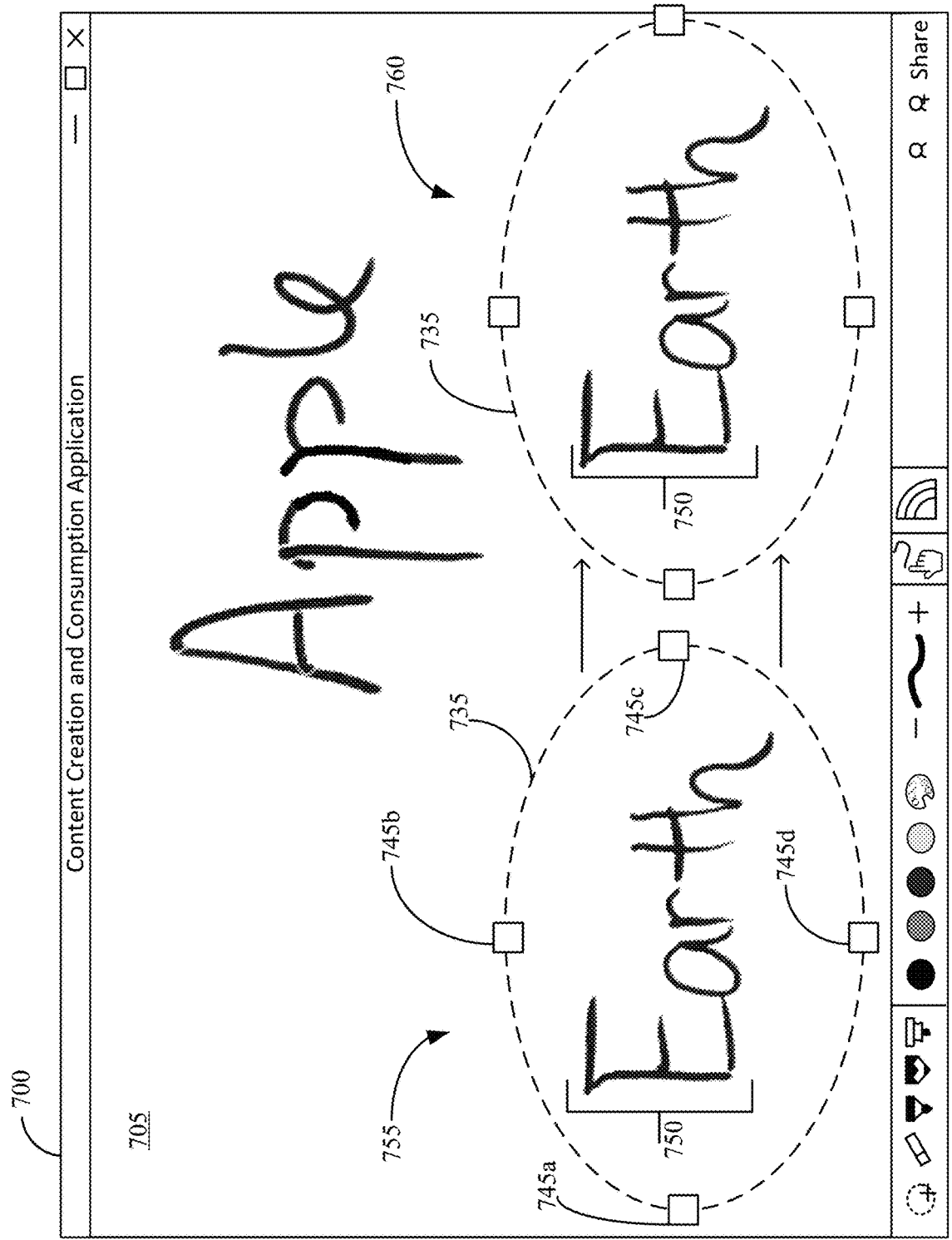

Referring to FIG. 7C, upon receiving the encircling and command to enter selection mode (via user selection (730) of the selection icon 725), a selection shape 735 may be displayed (surfaced) to the user at an origination point 737 in place of the inked circle. In this example, the selection shape 735 is a circle with multiple indicator handles 745 (e.g., indicator handle 745a, indicator handle 745b, indicator handle 745c, and indicator handle 745d) and the origination point 737 is the center of the drawn circle 715. However, the shape of the selection shape 735 is not limited thereto. For example, any of the shapes shown in FIGS. 5A-5F may be used.

Although the selection shape 735 is surfaced where the selection shape 735 is covering the content 710a, the selection shape 735 may, in some cases initially surface in front of the content in the UI and be moved to another location of the UI 705 to capture different content. For example, the selection shape 735 may be moved to the content 710b. There may be a time period that the selection shape floats and/or a select/deselect functionality Referring to FIG. 7D, the content 710a becomes captured content 750 and the user may then manipulate the captured content 750. The manipulation of the captured content 750 can include, but is not limited to, for example, moving the captured content 750, rotating the captured content 750, and scaling the captured content 750.

In this example, the captured content 750a is moved from an initial position 755 on the UI 760 to a second position 760 on the UI 705. The captured content 750 may be moved by a user interaction with the UI 705. For example, the user may press down on a location inside or on the selection shape 735 and perform a drag gesture to the desired location.

Figure 7E:
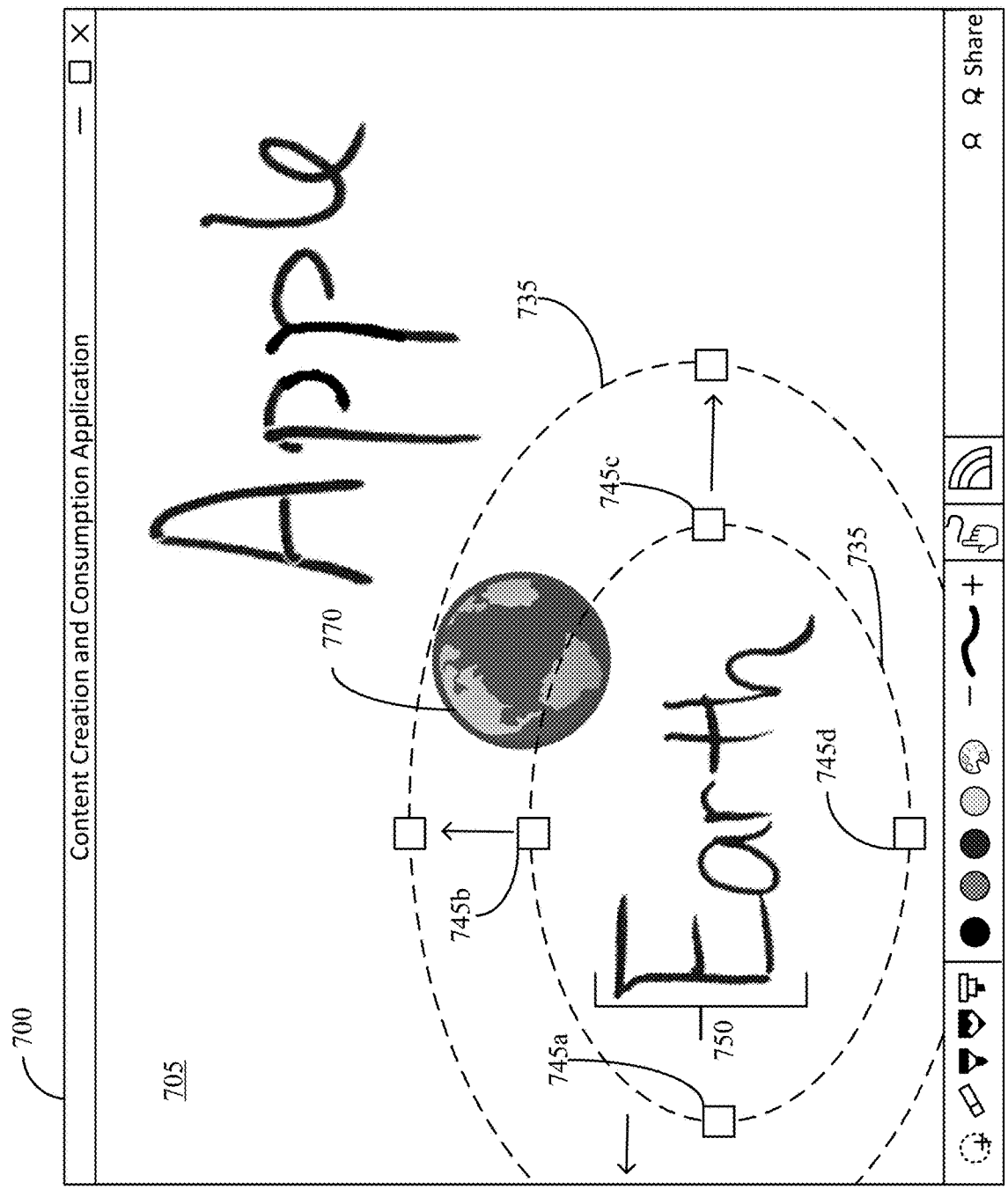

Referring to FIG. 7E, a user may have added additional content 770, such as a drawing of the earth, to the UI 705 after or before selecting content 710a of FIG. 7C. Initially, the selection shape 735 covers only the captured content 750, which is the word "Earth". The user can select the additional content 770 by expanding the selection shape 735 by any of the previously described methods. In this example, the user can drag one of the indication handles 745 until the selection shape 735 is large enough to cover both the captured content 750 and the additional content 770. The additional content 770 can then be included with the captured content 750.

Figure 8:
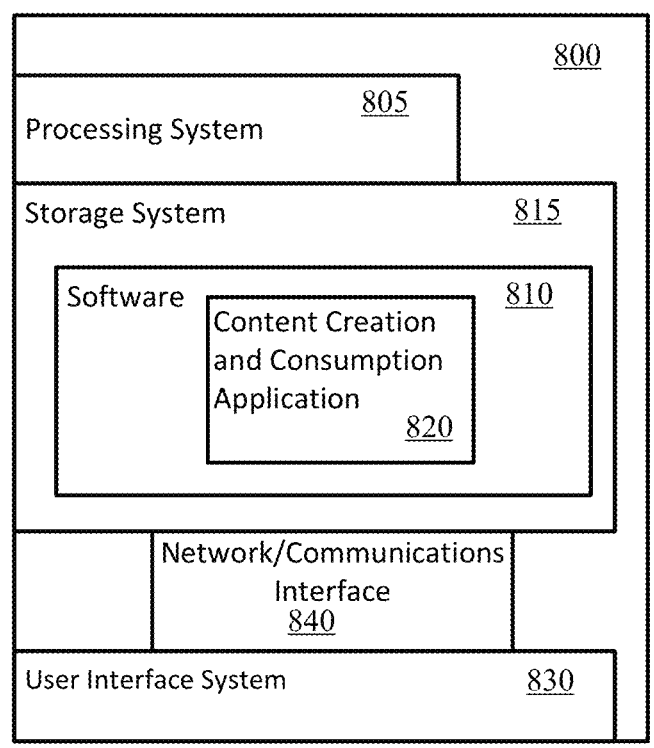
FIG. 8 illustrates components of a computing device or system that may be used in certain embodiments described herein.

FIG. 8 illustrates components of a computing device or system that may be used in certain embodiments described herein. Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, an interactive whiteboard, or a smart television. Accordingly, more or fewer elements described with respect to system 800 may be incorporated to implement a particular computing device.

System 800 includes a processing system 805 of one or more processors to transform or manipulate data according to the instructions of software 810 stored on a storage system 815. Examples of hardware processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as a content creation and consumption application 820. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the content creation and consumption application 820.

Storage system 815 may include volatile and nonvolatile memory, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 815 may be implemented as a single storage device but may also be implemented across multiple storage devices or sub-systems co-located or distributed relative to each other. Storage system 815 may include additional elements, such as a controller, capable of communicating with processing system 805.

In general, software may, when loaded into processing system 805 and executed, transform computing system 800 overall from a general-purpose computing system into a special-purpose computing system customized to retrieve and process the information for facilitating content authoring as described herein for each implementation. Indeed, encoding software on storage system 815 may transform the physical structure of storage system 815. The specific transformation of the physical structure may depend on various factors in different implementations of this description. Examples of such factors may include, but are not limited to the technology used to implement the storage media of storage system 815 and whether the computer-storage media are characterized as primary or secondary storage.

The system can further include a user interface system 830, which may include input/output (I/O) devices and components that enable communication between a user and the system 800. User interface system 830 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 830 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the selection of proximate content described herein may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

What is claimed is:

1. A method comprising:
    identifying an origination point for a selection shape, wherein the origination point is a location on a user interface where the selection shape is to be surfaced and anchored to, wherein the user interface displays a plurality of groupings of content;
    in response to identifying the origination point, surfacing the selection shape in the user interface and anchored to the origination point, wherein the selection shape forms an initial capture area;
    in response to surfacing the selection shape, capturing first content of the plurality of groupings of content displayed in the user interface that is within the initial capture area of the selection shape;
    identifying, in the first content, every grouping of content having a portion outside the initial capture area of the selection shape, wherein the first content comprises at least two groupings having a portion outside the initial capture area of the selection shape; and
    in response to identifying every grouping of content having the portion outside the initial capture area of the selection shape, capturing that portion of every grouping of content outside the initial capture area of the selection shape with the first content so that every grouping of content having the portion outside the initial capture area of the selection shape is entirely captured.

2. The method of claim 1, wherein at least one grouping of the plurality of groupings of content comprises ink strokes.

3. The method of claim 2, further comprising performing ink analysis on the ink strokes to identify groupings of the content, the at least one grouping of the plurality of groupings of content being identified as a grouping by the ink analysis.

4. The method of claim 1, wherein the identifying of every grouping of content having the portion outside the initial capture area of the selection shape comprises:
    performing a proximity calculation to identify content within a proximity distance threshold of the initial capture area of the selection shape.

5. The method of claim 1, further comprising:
    receiving a selection of a grouping of the first content; and
    removing the selected grouping of the first content from the initial capture area of the selection shape.

6. The method of claim 1, wherein the selection shape comprises capture zones.

7. The method of claim 6, further comprising:
    receiving indicia of expansion selecting one of the capture zones of the selection shape, wherein the capture area of the selection shape comprises all capture zones from the origination point up to and including the selected one of the capture zones.

8. A system, comprising:
    a user input interface;
    a processing system;
    one or more storage media; and
    an application stored on at least one of the one or more storage media that, when executed by the processing system, direct the processing system to:
        identify an origination point for a selection shape, wherein the origination point is a location on a user interface where the selection shape is to be surfaced and anchored to, wherein the user interface displays a plurality of groupings of content;
        in response to identifying the origination point, surface the selection shape in the user interface and anchored to the origination point, wherein the selection shape forms an initial capture area;
        in response to surfacing the selection shape, capture first content of the plurality of groupings of content displayed in the user interface that is within an initial capture area of the selection shape;
        identify, in the first content, every grouping of content having a portion outside the initial capture area of the selection shape, wherein the first content comprises at least two groupings having a portion outside the initial capture area of the selection shape; and
        in response to identifying every grouping of content having the portion outside the initial capture area of the selection shape, capture that portion of every grouping of content outside the initial capture area of the selection shape with the first content so that every grouping of content having the portion outside the initial capture area of the selection shape is entirely captured.

9. The system of claim 8, wherein at least one grouping of the plurality of groupings of content comprises ink strokes, wherein the application further directs the processing system to:
    perform ink analysis on the ink strokes to identify groupings of the content, the at least one grouping of the plurality of groupings of content being identified as a grouping by the ink analysis.

10. The system of claim 8, wherein to identify every grouping of content having a portion outside the capture area of the selection shape, the application directs the processing system to:
    perform a proximity calculation to identify content within a proximity distance threshold of the initial capture area of the selection shape.

11. The system of claim 8, wherein the application further directs the processing system to:
    receive a selection of a grouping of the first content; and
    remove the selected grouping of the first content from the initial capture area of the selection shape.

12. The system of claim 8, wherein the selection shape comprises capture zones, wherein the application further directs the processing system to:
    receive indicia of expansion selecting one of the capture zones of the selection shape, wherein the capture area of the selection shape comprises all capture zones from the origination point up to and including the selected one of the capture zones.

13. One or more computer readable storage media having instructions for an application stored thereon what when executed by a processing system, direct the processing system to at least:
    identify an origination point for a selection shape, wherein the origination point is a location on a user interface where the selection shape is to be surfaced and anchored to, wherein the user interface displays a plurality of groupings of content;
    in response to identifying the origination point, surface the selection shape in the user interface and anchored to the origination point, wherein the selection shape forms an initial capture area;
    in response to surfacing the selection shape, capture first content of the plurality of groupings of content displayed in the user interface that is within an initial capture area of the selection shape;

identify, in the first content, every grouping of content having a portion outside the initial capture area of the selection shape, wherein the first content comprises at least two groupings having a portion outside the initial capture area of the selection shape; and in response to identifying every grouping of content having the portion outside the initial capture area of the selection shape, capture that portion of every grouping of content outside the initial capture area of the selection shape with the first content so that every grouping of content having the portion outside the initial capture area of the selection shape is entirely captured.

14. The media of claim 13, wherein at least one grouping of the plurality of groupings of content comprises ink strokes, wherein the instructions further direct the processing system to:

perform ink analysis on the ink strokes to identify groupings of the content, the at least one grouping of content being identified as a grouping by the ink analysis.

15. The media of claim 13, wherein to identify every grouping of content having a portion outside the initial capture area of the selection shape, the instructions direct the processing system to:

perform a proximity calculation to identify content within a proximity distance threshold of the initial capture area of the selection shape.

16. The media of claim 13, wherein the instructions further direct the processing system to:

receive a selection of a grouping of the first content; and
remove the selected grouping of the first content from the initial capture area of the selection shape.

17. The media of claim 13, wherein the selection shape comprises capture zones, wherein the instructions further direct the processing system to:

receive indicia of expansion selecting one of the capture zones of the selection shape, wherein the capture area of the selection shape comprises all capture zones from the origination point up to and including the selected one of the capture zones.

\* \* \* \* \*